United States Patent [19]
Maurer et al.

[11] 3,834,503
[45] Sept. 10, 1974

[54] DUAL HYDRAULIC COUPLING

[75] Inventors: Gerhard Maurer; Fritz Geiger, both of Friedrichshafen, Germany

[73] Assignee: Zahnradfabrik Friedrichshafen Aktiengesellschaft, Friedrichshafen, Germany

[22] Filed: Apr. 2, 1973

[21] Appl. No.: 347,341

[30] Foreign Application Priority Data
Apr. 1, 1972 Germany.............................. 2215922

[52] U.S. Cl. .......................... 192/113 B, 192/87.17
[51] Int. Cl. ............................................. F16d 13/72
[58] Field of Search ...................... 192/87.17, 113 B

[56] References Cited
UNITED STATES PATENTS
2,920,732   1/1960   Richards et al. ................. 192/87.17
3,080,774   3/1963   Nickerson et al. .............. 192/113 B
3,099,166   7/1963   Schou.............................. 192/113 B Primary Examiner—Benjamin W. Wyche
Attorney, Agent, or Firm—Karl F. Ross; Herbert Dubno

[57] ABSTRACT

A dual hydraulic clutch, mounted on a shaft for operatively connecting same with either of two pinions seated thereon, has a central partition flanked by two axially movable pistons adapted to co-operate with respective sets of clutch plates. An axial displacement of either piston entrains two interconnected rings on opposite sides of the partition, each ring carrying a pair of spring-loaded plungers normally bearing on the partition for biasing both pistons into a retracted position. Upon the admission of pressure fluid to a piston for the engagement of its clutch plates, the corresponding plungers unblock a pair of normally blocked ports in the partition for the circulation of lubricant to the respective clutch assembly.

10 Claims, 2 Drawing Figures

DUAL HYDRAULIC COUPLING

FIELD OF THE INVENTION

Our present invention relates to a dual hydraulic coupling, operating as a clutch or a brake, designed to establish alternate operative connections between a central structure and a pair of associated transmission elements.

BACKGROUND OF THE INVENTION

The need for the use of such dual couplings arises, for example, in an automotive transmission in which an engine-driven input shaft is to be coupled to an output shaft through either of two pinions forming part of a reversing gear. Also, conventional planetary-gear transmissions include alternately actuatable brakes for completing an operative connection between either of two transmission elements and a stationary member such as a gear housing.

In each of these cases it is advantageous to provide a common supporting structure for the two alternatively actuatable coupling assemblies for the purpose of saving space and simplifying the hydraulic system.

OBJECTS OF THE INVENTION

The general object of our invention is to provide means in such a dual hydraulic coupling for facilitating the forced lubrication and cooling of whichever coupling assembly is operative at the time, with interruption of the ancillary fluid flow in the disengaged state of the assembly.

A more particular object is to provide means in such a system for optimizing the working pressure of the ancillary fluid (lubricant and/or coolant) in conformity with existing operating conditions.

SUMMARY OF THE INVENTION

These objects are realized, in accordance with our present invention, by the provision of a carriage which is slidably guided in the central structure for entrainment by either of two pistons, seated in oppositely faced cylinders, into a working position under the pressure of hydraulic fluid (referred to hereinafter as oil) selectively admitted thereto. The carriage is provided with resilient means, such as two sets of spring-loaded plungers, normally bearing upon the central structure to bias the pistons into their retracted positions; this biasing action also controls the opening and closure of valve means for the circulation of ancillary fluid (generally the same kind of oil) through the assembly which is engaged by the operative displacement of its piston.

In the preferred embodiment described hereinafter, the central structure comprises a shaft rigid with an annular partition which is flanked by the two coupling assemblies and their pistons, the carriage being designed as an annular cage coaxially mounted on the shaft; the ancillary fluid, referred to hereinafter as lubricating oil, passes through a supply conduit in this shaft and preferably, in the case in which this shaft is powered by an engine, is delivered to that conduit by a pump driven directly or indirectly from the engine so that its delivery pressure varies with the shaft speed. At high speeds, therefore, the lubricant flows at an accelerated rate through the engaged clutch assembly.

BRIEF DESCRIPTION OF THE DRAWING

The above and other features of our invention will now be described in detail with reference to the accompanying drawing in which.

SPECIFIC DESCRIPTION

Figure 1:
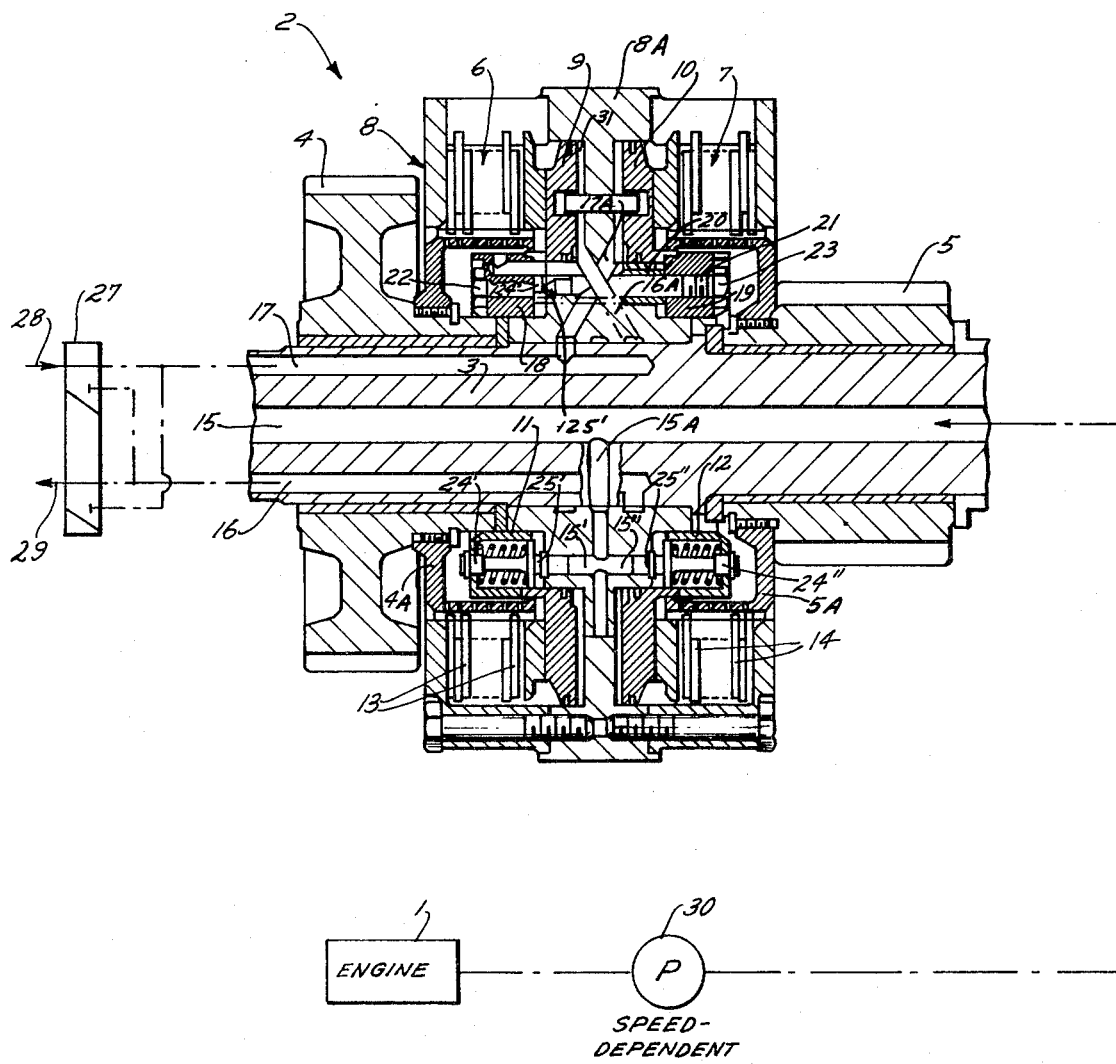
FIG. 1 is an axial sectional view of a dual hydraulic clutch embodying our invention.

The system shown in the drawing comprises an input shaft 3 which is driven from an automotive engine 1 as part of a conventional power train including a nonillustrated speed reducer and a reversing gear generally designated at 2. This reversing gear comprises a pair of pinions 4 and 5 freely rotatable on shaft 3, the smaller pinion 5 being connected through an intermediate pinion (not shown) with a gear on a nonillustrated output shaft on which another gear can be driven directly by the larger pinion 4, as is well known per se. Pinions 4 and 5 are provided with annular flanges 4A and 5A carrying sets of annular plates 13, 14 which form part of two conventional clutch assemblies 6 and 7, being interleaved with other plates mounted on an annular structure 8 which includes a central partition 8A rigid with shaft 3.

The clutch plates of each assembly 6, 7 are axially compressible against one another by a pair of annular pistons 9 and 10, respectively, which are received in cylinders 31, 32 on opposite sides of partition 6A. Cylinder 31 communicates via a conduit 16A and an annular groove 16B with a channel 16 extending axially within shaft 3; a similar channel 17 is connected by way of an annular groove 17B and a conduit 17A with cylinder 32. The two channels 16 and 17 are alternately connectable, through a preferably electromagnetic valve 27, to a high-pressure conduit 28 and a low-pressure conduit 29 of an oil-circulating system not further illustrated. Valve 27, which in its illustrated position supplies oil under pressure to channel 17 and cylinder 32, may also have an intermediate position in which neither channel is pressurized.

Figure 2:
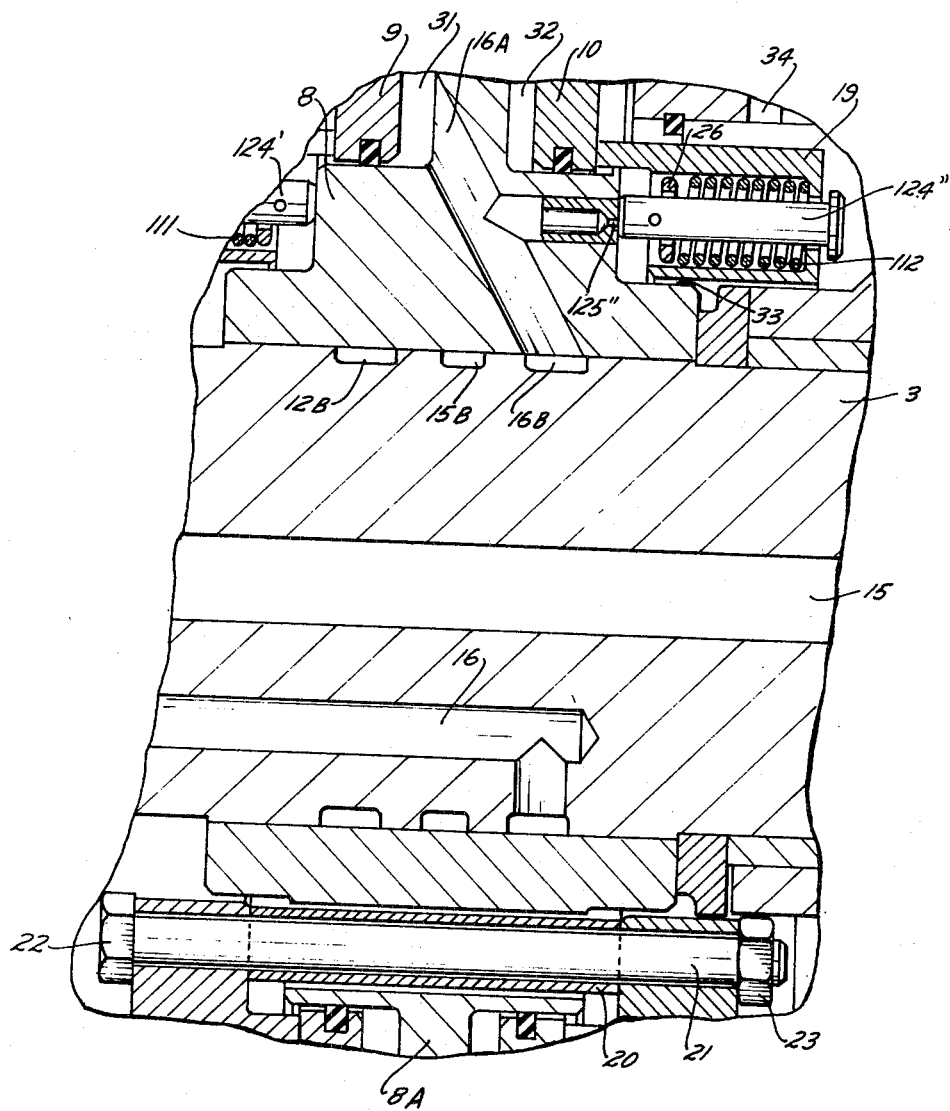
FIG. 2 is a fragmentary view similar to FIG. 1, drawn to a larger scale.

Two end rings 18 and 19 form part of an axially slidable cage which also includes a set of peripherally spaced rods 21 with threaded ends engaged by nuts 22, 23 to hold the rings against respective spacer tubes 20, a portion of one such tube being shown above the shaft 3 in FIG. 1 whereas another such tube is fully illustrated in the lower part of FIG. 2. Tubes 20 are slidably lodged in partition 8A, allowing the cage to be entrained as a unit by whichever piston 9, 10 is hydraulically shifted away from partition 8A upon pressurization of its cylinder 31 or 32. This entrainment of cage 18–23 takes place against the centering force of at least two plungers 24', 124' on the left and 24'', 124'' on the right, these plungers being urged toward partition 8A by loading springs 11, 111 and 12, 112 bearing upon disks 26 secured to the plungers. Aside from thus tending to center the cage and with it the pistons 9 and 10 with reference to structure 8, the spring-loaded plungers 24', 24'' and 124', 124'' also function as valves normally locking respective entrance ports 25', 25'' and 125', 125'' by which lubricating oil from a pump 30 can be circulated through assembly 6 or 7. The lubricating circuit includes a central supply conduit 15 in shaft 3 with a branch 15A, communicating with an annular groove 15B on the shaft, and extension conduits 15', 15" leading to ports 25' and 25" as shown in the lower part of FIG. 1. Exit ports 125' and 125" communicate, respectively, with conduits 16A and 16B as particularly illustrated for the former in FIG. 2. The construction of all the plungers, as illustrated in FIG. 2 for plunger 124", is substantially the same.

Pump 30 is driven from engine 1, possibly through the same nonillustrated speed reducer as shaft 3, so that its delivery pressure varies with the speed of that shaft; the lubricating oil therefore arives at conduit 15 under a pressure substantially proportional to speed.

Upon the operative displacement of either piston into a working position, e.g., a shaft of piston 10 the right by the application of oil pressure to conduit 17, the cage 18–23 follows suit and lifts the associated plungers (here 24" and 124") off their respective ports so that the lubricating oil circulates through the actuated clutch assembly, specifically the assembly 7 in the case here considered. This lubrication path extends from the unblocked port 25" via a gap 33 between ring 19 and structure 8 to a set of perforations 34 in flange 5A and then, at a diametrically opposite location, through the same gap to the unblocked exit port 125" for drainage of the oil through conduit 16a, channel 16 and conduit 29.

Upon reversal of the valve 27, lubrication and cooling of assembly 6 takes place in an analogous manner.

We claim:
1. A dual hydraulic coupling comprising:
   a central structure forming a pair of oppositely facing hydraulic cylinders;
   a pair of pistons in said cylinders;
   a pair of transmission elements on opposite sides of said structure;
   a pair of associated coupling assemblies respectively interposed between said pistons and said transmission elements for operatively connecting the latter with said structure, said pistons being hydraulically shiftable into respective working positions for actuating the associated coupling assemblies;
   a carriage slidably guided in said structure for entrainment by either of said pistons upon displacement thereof into its working position, said carriage being provided with resilient means normally bearing upon said structure for biasing said pistons into a retracted position;
   a source of ancillary fluid for said assemblies; and
   valve means controlled by said biasing means for establishing a flow path from source through either of said assemblies upon displacement of the associated piston into said working position thereof.
2. A coupling as defined in claim 1 wherein said structure comprises a shaft and an annular partition rigid with said shaft, said pistons and assemblies being annular and coaxially mounted on said shaft, said carriage being an annular cage centered on the shaft axis.
3. A coupling as defined in claim 2 wherein said transmission elements are pinions carried on said shaft on opposite sides of said partition.
4. A coupling as defined in claim 2 wherein said source includes a supply conduit in said shaft.
5. A coupling as defined in claim 4 wherein said shaft is part of a power train driven by an engine, said source further including a pump driven by said engine and working into said conduit with a speed-depending pressure.
6. A coupling as defined in claim 4 wherein said cage comprises a pair of end rings each provided with at least two spring-loaded plungers normally bearing upon said partition at peripherally spaced points, said valve means including a pair of entrance ports and a pair of exit ports in said partition obstructed by said plungers in the retracted position of the associated pistons, said entrance ports communicating with said supply conduit, said exit ports opening into respective drains.
7. A coupling as defined in claim 6 wherein said shaft is provided with two channels alternately connectable to the high-pressure side and the low-pressure side of a circulation system for hydraulic fluid, each of said channels communicating with a respective cylinder for operatively displacing the associated piston upon being connected to said high-pressure side, the drain of each exit port opening into the channel communicating with the cylinder on the opposite side of said partition.
8. A coupling as defined in claim 6 wherein said cage comprises a set of threaded rods connected with said end rings and spacer tubes surrounding said rods between said end rings, said spacer tubes being slidably mounted in said partition.
9. A coupling as defined in claim 6 wherein said cage comprises a set of threaded rods connected with said end rings and spacer tubes surrounding said rods between said end rings, said spacer tubes being slidably mounted in said partition.
10. A coupling as defined in claim 4 wherein said supply conduit passes through said shaft along the axis thereof.

* * * * *